United States Patent [19]

Strader

[11] Patent Number: 4,888,377

[45] Date of Patent: Dec. 19, 1989

[54] COMPOSITION FOR MAKING PERMANENT IMPRESSIONS

[76] Inventor: Judith D. Strader, Shandon Star Route - Ross Dr., Paso Robles, Calif. 93446

[21] Appl. No.: 931,210

[22] Filed: Nov. 17, 1986

Related U.S. Application Data

[63] Continuation-in-part of Ser. No. 643,093, Aug. 21, 1984, abandoned.

[51] Int. Cl.⁴ .............................................. C08J 00/00
[52] U.S. Cl. .................................... 524/425; 524/114; 524/401; 524/493; 264/220; 264/225
[58] Field of Search ............... 264/219, 220, 222, 223; 521/61, 73; 524/425, 401, 114, 493; 433/214

[56] References Cited

U.S. PATENT DOCUMENTS

| | | | |
|---|---|---|---|
| 2,599,573 | 6/1952 | Milton | 18/47.5 |
| 2,837,440 | 6/1958 | Boivin | 264/46.3 |
| 2,855,631 | 10/1958 | Rowley | 264/211 |
| 3,247,158 | 4/1966 | Alford | 260/410 |
| 4,248,761 | 2/1981 | Pluddeman | 524/425 |
| 4,250,064 | 2/1981 | Chandler | 260/40 R |

OTHER PUBLICATIONS

Modern Plastics encyclopedia (1965), p. 528.
Plastisols and Organisols, Savatnick, (1972), pp. 33-34, 112, 115, 125, 127, 133-135.

Primary Examiner—Jay H. Woo
Assistant Examiner—Jeremiah Durkin
Attorney, Agent, or Firm—Daniel C. McKown

[57] ABSTRACT

A composition for receiving and permanently recording impressions including a plastisol, finely ground non-absorbing particulate matter and a small quantity of salt. The particulate matter is limestone and sand.

3 Claims, No Drawings

COMPOSITION FOR MAKING PERMANENT IMPRESSIONS

BACKGROUND AND SUMMARY OF THE INVENTION

This application is a continuation-in-part of my earlier application Ser. No. 643,093 filed Aug. 21, 14, 1984, now abandoned.

The present invention is a composition for a dough-like substance in which impressions of hands, feet, or various objects can be made and preserved in the following manner.

The consumer purchases a kit which includes a quantity of the dough-like substance and a tray-like plaque. The consumer spreads the substance onto the surface of the plaque in a layer that typically may be 1.0 centimeter thick. Thereafter, impressions of hand prints, foot prints or objects are made in the exposed surface of the dough-like substance, and the substance may also be inscribed with dates and names. Next, the plaque with the impressed substance is baked in an oven, which causes the substance to harden and to adhere tightly to the plaque. After being removed from the oven, the plaque can be displayed as a permanent memento.

The composition of the present invention has a shelf life (prior to use) in excess of twenty years, has a dough-like consistency before baking, receives and holds impressions well, and after baking has the rigidity, permanence, and appearance of sandstone.

In a preferred embodiment, the substance consists of non-absorbing particulate matter bound together by a plastisol and mixed with a small amount of salt.

DETAILED DESCRIPTION OF THE PREFERRED EMBODIMENT

In a preferred embodiment of the present invention, the composition is produced in 35 pound batches. These batches are built up in a mixer by adding in sequence the following ingredients: 5 pounds of plastisol, 12.5 pounds of ground limestone, 17.5 pounds of sand, and 1.0 teaspoon of salt. Larger or smaller batches can be produced by adding in sequence: 14.3% by weight of plastisol, 35.7% by weight of ground limestone, 50.0% by weight of sand, and then adding to the mixture one teaspoon of salt for each 35 pounds of the mixture.

The plastisol used in the preferred embodiment is available as product No. PCE 27-7 from Go-Ray Manufacturing Company, 1560 N. Missile Way, Anaheim, California 92801.

The plastisol used in the preferred embodiment has the following composition; to make 1000 parts of plastisol, the following are mixed:

---

578 parts of dioctyl phthalate, also known in the trade as DOP and available from Ashland Chemical Co. In another embodiment, di (2-ethylatxyl) phthalate available from Eastman is substituted.

68 parts of epoxidized triglyceride, also known in the trade as Plascheck 775 and available from Ferro Corp.

14 parts of calcium-zinc soap blend, also known in the trade as Mark 152M, available from Argus Chemical Corp.

450 parts of polyvinyl chloride, available from Occidental Chemical Corp. under the catalog number FPC 654.

1000 parts of plastisol.

---

Plastisols containing organic fillers should be avoided because they have a tendency to bubble and discolor when baked.

The ground limestone is known as VICRON 41-8. VICRON is a registered trademark of the supplier, Pfizer Minerals, Pigments and Metals Division, 235 East 42th Street, New York, New York 10017. The ground limestone is approximately 325 mesh and serves as an extending agent. In other embodiments, VICRON 31-6 (approximately 500 mesh) is used.

Too much ground limestone makes the mixture too dry to receive the sand. The fine mesh of the ground limestone enables the substance to record impressions of the finest detail. If too little ground limestone is used, the mixture will be too fluid.

The sand also serves as an extending agent and is a staple item of commerce. The sand should be clean and in the range of 30-80 mesh. It is believed that the presence of the sand in the substance allows gases to vent out during the baking, without disturbing the impression. If the sand is omitted, bubbles will form during baking inside the substance, thereby distorting the impression, and on the exposed surface of the substance. These bubbles will become a permanent part of the product.

Too much sand makes the mixture too hard to record impressions well, but if too little sand is used, the mixture will be too thin.

The salt used is a staple item of commerce and consists essentially of sodium chloride. In the preferred embodiment, one teaspoon of salt is used for each 17.5 pounds of sand used. The present inventor has found that the salt prevents the substance from becoming scorched or burned during the baking process. It was discovered that salty beach sand, unlike washed sand, practically eliminated scorching. However, in the preferred embodiment the sand used has been washed to eliminate other contaminants and debris, and salt is added separately to the mixture.

In the preferred embodiment, the impressed substance is baked on a plaque at a temperature of 400° F. for 15 minutes.

It is recognized that the ground limestone can be replaced by an equal weight of any non-absorbing particulate of about the same mesh. Likewise, the sand could be replaced by an equal weight of a non-absorbing particulate of 30-80 mesh.

It has been found that if the total weight of the admixed particulate matter exceeds about 7 times the weight of the plastisol, the mixture will be too unyielding to produce satisfactory impressions. If the total weight of the admixed particulate matter is less than about 4 times the weight of the plastisol, the mixture will be too fluid to retain impressions until the impressed mixture has been baked to its hardened state.

As mentioned above, the ingredients must be mixed in the order they are listed. When the plastisol and half of the limestone are mixed in the first stage of mixing, a taffy-like mixture results. Then the remainder of the limestone is added and a dough-like mixture results that readily takes up the sand in the next stage of mixing.

The mixed substance retains its consistency and character during a shelf life in excess of twenty years, when stored at normal room temperatures.

Once the composition has been mixed, it has a homogeneous dough-like consistency that allows it to be spread out to a desired shape on the plaque and allows it to receive impressions from objects pushed into it.

In the preferred embodiment, the baking temperature should be within the range of 350°–450° F. Temperatures higher than 450° F. will result in scorching of the substance, while baking temperatures less than 350° F. are insufficient to cause the substance to set-up properly.

As described above, this impression-holding mixture is spread over the surface of a plaque in a layer that typically is 1.0 centimeter thick, and in which layer impressions are made. The plaque supports the weight of the layer and this minimizes settling or slumping of the layer under the effect of gravity. The material has a doughlike consistency at the time the impressions are made, and this consistency is ideal for receiving impressions. However, the dough-like consistency is too soft to permit use of the material in sculpturing three-dimensional freestanding objects, such as statuettes.

The present inventor has discovered that a material suitable for use in sculpturing can be produced simply by adding one compound to the impression-holding mixture described above. In the preferred embodiment, the sculpture mixture is produced by adding to a 35 pound batch of the impression-holding mixture one of the following:

(a) at least 11 ounces (wt.) of ZEOTHIX 265, but not more than 12 ounces;

or (b) at least 11 ounces (wt.) of ZEOFREE 80, but not more than 12 ounces;

or (c) at least 22 ounces (wt.) of ZEOLEX 80, but not more than 24 ounces.

ZEOTHIX, ZEOFREE, and ZEOLEX are registered trademarks of the J. M. Huber Corporation of Havre de Grace, Maryland, from which the materials may be obtained. ZEOTHIX 265 is essentially hydrated silicon dioxide. ZEOFREE 80 is essentially precipitated amorphous hydrated silicon dioxide. ZEOLEX 80 is a silicate prime pigment extender for paint.

The sculpture mixture that results when either (a) or (b) or (c) is added to a 35 pound batch of the impression-holding mixture is sufficiently stiff that three-dimensional statuettes made from it will hold their shape prior to baking. Eleven ounces in the case of (a) and (b), and 22 ounces in the case of (c) seem to be the least amount necessary to avoid stickiness so that the mix can be handled; if more than 12 ounces of (a) or (b) or 24 ounces of (c) are used, the mixture will lack cohesion. The statuettes should not be thicker than one inch; otherwise they have a tendency to crack open during baking.

Before baking, the sculpture blend can be carved as if it were made of clay or wax. After baking, it becomes hard, like sandstone.

The sculpture blend can also be molded by pressing it manually into molds. Vinyl hot melt molds have been found to be the most satisfactory.

Thus, there has been described a composition for a substance that is particularly useful in receiving and holding impressions, and in which the impressions become permanently prserved when the substance has been baked. A preferred embodiment of the composition has been given and various alternative compositions have been described. A process for making the composition has been described, and a method for recording and permanently preserving impressions has been set forth.

What is claimed is:

1. A composition wherein it can receive and retain impressions while in an ungelled dough-like initial state and in that it can be baked to a rock-like state to preserve the impressions without bubbling and without scorching, said composition consisting essentially of:

about 14.3% by weight of an organic filler-free plastisol;

about 35.7% by weight of ground limestone, having a fineness of at least 325 mesh to enable the composition to receive impressions of fine detail;

about 50.0% by weight of sand having a fineness in the range of 30 to 80 mesh, said sand serving to prevent bubbles from forming during the baking so that the impressions will not be distorted by internal and surface bubbles; and, about one teaspoon of salt for each 17.5 pounds of sand, said salt serving to prevent scorching during baking, whereby the baked composition has an attractive uniform color.

2. A process for making a substance that can receive and retain impressions while in an ungelled dough-like initial state and that can be baked to a rock-like state to preserve the impressions without bubbling and without scorching, said process wherein the steps are performed in the indicated order it is possible to obtain a uniform mixture in which a plastisol is extended to an unusual degree, said process comprising the steps of:

(a) placing a quantity of an organic filler-free plastisol into a mixer;

(b) adding to the plastisol and mixing in approximately 2.5 parts by weight for each part of plastisol of a non-absorbent particulate material having a fineness of at least 325 mesh; then, (c) adding to the mixture produced by step b) and mixing in approximately 3.5 parts by weight for each part of plastisol of a non-absorbent particulate material having a fineness in the range of 30 to 80 mesh.

3. A composition wherein it can be sculptured and will hold its shape after being sculptured, and in that it can be baked to a rock-like state without bubbling and without scorching, said composition consisting essentially of:

about 14% by weight of an organic filler-free plastisol;

about 35% by weight of ground limestone, having a fineness of at least 325 mesh;

about 49% by weight of sand having a fineness in the range of 30 to 80 mesh and serving to prevent bubbles from forming during the baking;

about one teaspoon of salt for each 17.5 pounds of sand, said salt serving to prevent scorching during baking; and, about 2% by weight of either hydrated silicon dioxide or precipitated amorphous hydrated silicon dioxide.

* * * * *